Patented Sept. 19, 1950

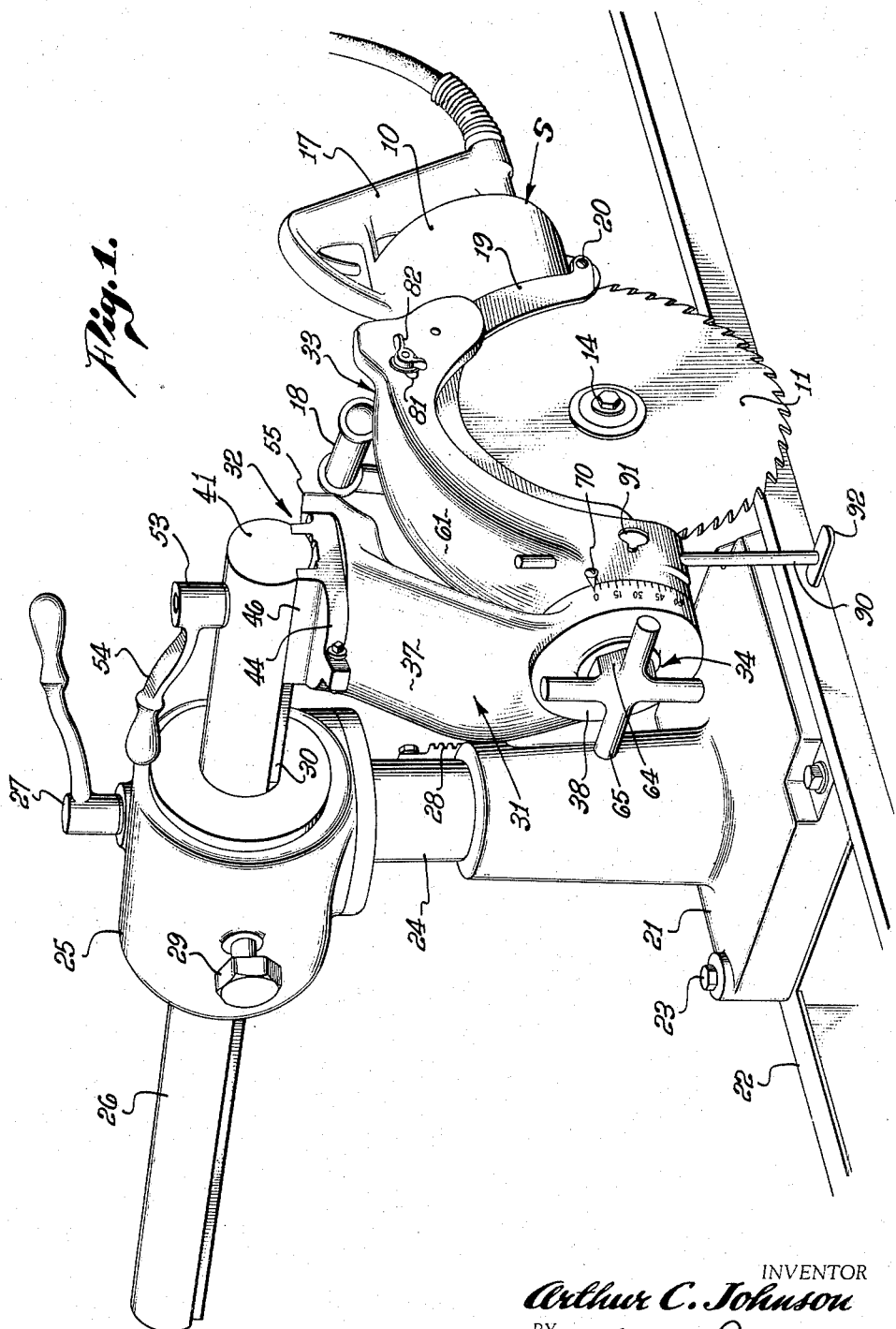

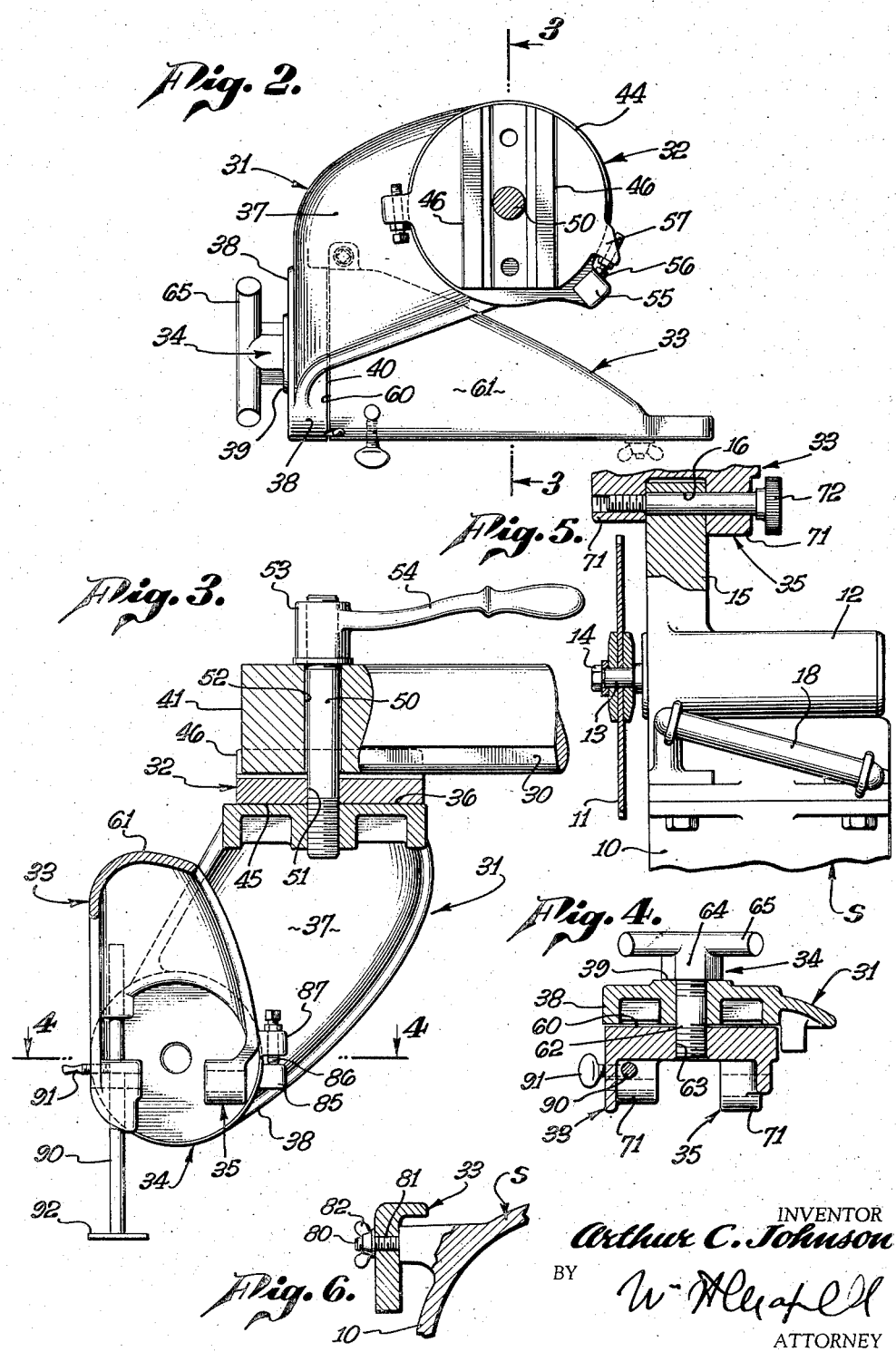

2,522,789

UNITED STATES PATENT OFFICE 2,522,789

RADIAL ARM MOUNTING FOR POWER-DRIVEN SAWS

Arthur C. Johnson, San Marino, Calif.

Application April 13, 1946, Serial No. 662,066

7 Claims. (Cl. 143—6)

This invention has to do with a mounting for a power driven saw and is more specifically concerned with a mounting for applying a power driven saw, of the type ordinarily employed as a hand tool, on the arm of a tool support designed to carry a tool for certain adjustment and for reciprocation so the tool is carried into and out of engagement with the work. It is a general object of the present invention to provide a mounting of the general character referred to that is simple, inexpensive of manufacture, and which supports the power driven saw in a most advantageous manner.

Various power driven hand tools are in common use and one type of power driven hand tool is a power driven saw which involves, generally, a small electric motor and a disc saw driven by the motor through a head so that the saw is on an axis transverse of the motor and in a plane to one side of the motor. Such devices commonly include a saw guard which is fixed to or rigid with the motor case and the head through which the saw is driven. Tool or machine supports are in general use designed to carry a saw or the like so that they can be reciprocated to the desired angle into and out of engagement with work. It has been common practice to design and construct such supports to accommodate a power driven saw formed for attachment to the support and in most instances such power driven saws are heavy, cumbersome structures requiring the support for their operation, and they are not in the category of hand tools. Heretofore, power driven saws carried by or forming a part of supports such as I have referred to have been available and used for one class of work and hand saws have been available and used for a different class of work, namely only where the saw can be manipulated by hand.

It is a general object of my present invention to provide a mounting whereby a power driven hand saw can be easily and quickly mounted on or applied to a support so that one tool, that is one power driven saw, can be used to advantage to perform two classes of service such as I have hereinabove referred to.

It is a general object of this invention to provide a saw mounting of the general character mentioned which involves a minimum number of simple inexpensive parts and which is such that it can be very easily and quickly applied to a support and is such as to readily receive a power driven saw to support the saw in a most advantageous manner.

A further object of this invention is to provide a saw mounting of the character mentioned which involves pivotal mountings or pivotal connections whereby the supported saw can be readily adjusted to various desirable working positions relative to the support, making the assembly advantageous for practical use.

The various objects and features of my invention wil be fully understood from the following detailed description of a typical preferred form and application of the invention, throughout which description reference is made to the accompanying drawings, in which:

Fig. 1 is a perspective view of the mounting that I have provided showing it in a typical operating position mounting a typical hand power saw on a typical tool support. Fig. 2 is a plan view of the mounting that I have provided taken at the plane of connection between the mounting and arm of the support and showing the mounting alone, or without the arm, and without the power driven hand saw. Fig. 3 is a detailed sectional view of the structure taken as indicated by line 3—3 on Fig. 2. Fig. 4 is a detailed sectional view taken as indicated by line 4—4 on Fig. 3. Fig. 5 is a detailed sectional view showing the manner in which the forward end of the saw is connected to the mounting, and Fig. 6 is a sectional view showing a screw connection that may be employed to supplement the connection shown in Fig. 5.

The mounting that I have provided is intended primarily to serve as a coupling between a typical power driven hand saw and the arm of a tool support. It will be recognized that power driven hand saws vary considerably in size, form and design, as do tool supports, and therefore, I do not wish my invention understood as limited to the particular hand saw and tool support that I have shown in order to facilitate an understanding of the invention. Likewise, it will be apparent that certain details of my mounting may be varied in order to accommodate the invention to any particular hand saw that may be employed or to accommodate it to a particular tool support that may be employed. It is also to be understood that when I refer to the location or direction of axes or of parts either of the mounting, the support, or the power driven saw, I am referring to the normal or common location of such axes or parts, and I do not mean to exclude the possibility of utilizing the invention under a shifted or changed condition as circumstances may require. For example, I will, in describing my invention, refer to the mounting as applied to a horizontally reciprocable arm of a support, whereas it will be apparent that the arm can be shifted to some other position if desired. Likewise, I will refer to the principal axis of the hand tool or power driven saw as being horizontally disposed and I will refer to the saw blade itself as being a disc and as being on an axis transverse of the main axis of the saw and in a plane to one side of the main axis of the saw, whereas in practice these detailed relationships may be varied, all without departing from the broader principles of my invention.

The power driven hand saw that I have shown in the drawings, and which I have designated S, will be referred to generally as the saw. The saw involves, generally, an electric motor having a suitable case 10, a disc-shaped saw blade 11, a head 12 at the forward end of the motor case 10 carrying a drive for the saw shaft 13 which projects from the assembled case and head to carry the blade 11 in a plane parallel to the longitudinal axis of the structure formed by the case and head. The saw shaft 13 extends transverse of the principal axis of the saw S and the saw blade may be retained on the shaft through a suitable retaining device 14. The saw S further includes a projection 15 at the forward end of the case which projection has a transverse aperture or opening 16. The saw S is further equipped with suitable handles by which it is held and manipulated when used as a hand saw. The particular saw illustrated has a handle 17 at the rear end of the motor case 10 and has a transverse handle 18 located in a convenient position offset from the assembled motor case and head at a point in the vicinity of the point of connection between the case and head. The saw further includes a blade guard 19 carried by the motor case and head to extend around or overlie the upper portion of the saw blade. In accordance with conventional construction the guard may be formed of sections joined by screws 20.

The support that I have shown in the drawings involves, generally, a base 21 to be secured to a fixed platform 22, or the like, as by mounting bolts 23, a post 24 projecting upwardly from the base to be adjustable vertically relative to the base, a bearing case 25 on the upper end of the post rotatable relative to the base and an arm 26 slidably supported by or through the bearing case 25 so that it is movable horizontally. The support may include various features such as a clamp means 27 for setting the case 25 in the desired rotative position relative to the base 21, rack means 28 for adjusting the post relative to the case, etc. In practice my invention can be applied to any suitable arm construction and my construction will be varied to make it fit the particular support arm encountered. The arm illustrated in the drawings is generally round in cross section or in the form of a round bar with downwardly faced guides 30 which cooperate with means in the case 25 to prevent rotation of the arm in the case.

The mounting that I have provided involves, generally, an arm bracket 31, means 32 connecting the arm bracket to the arm 26, a saw bracket 33, means 34 connecting the lower end of the arm bracket 31 and the forward end of the saw bracket 33, and means 35 for mounting the saw S in the saw bracket.

The arm bracket 31 is pivotally connected to the support arm 26 by means 32, preferably to the forward end of the support arm, and it serves as a mounting or carrier to which the saw arm 33 is pivotally connected by means 34. In the particular form of construction illustrated the upper end of the arm bracket 31 is somewhat enlarged and is finished to present a flat horizontal upper end face 36. The means 32 connects the upper end of the arm bracket 31 to the arm 26 so that the shank portion 37 of the bracket extends downwardly and laterally from the arm 26 so the lower end 38 of the arm bracket is located well below the arm 26 and is laterally offset therefrom. The lower end portion 38 of the arm bracket is preferably in the form of a flat disc that is vertically disposed and has a flat outer end face 39 and a flat inner end face 40.

It is preferred to form the arm bracket so that it extends not only down from the outer end portion of the arm 26 and also laterally to one side thereof, but so that it also extends longitudinally of the arm or forward from the end portion of the arm so that the lower end portion 38 is located somewhat beyond or forward of the forward end 41 of the arm.

The means 32 for connecting the arm bracket 31 with the arm 26 is a pivotal mounting means and may involve a plate 44 applied to the under side of the arm 26 at the forward end thereof to present a downwardly disposed flat face 45 against which the face 36 of the arm bracket fits. A pair of spaced projections 46 are provided on the upper side of the plate 44 to seat in the guideways 30 provided in the arm 26. A stud 50 is provided on the upper end of the arm bracket 31 to project upwardly from the face 36 through a central aperture 51 in the plate 44 and through a vertical bore 52 in the end portion of the arm 26. A clamp nut 53 is threaded on the end of the stud that projects above the arm and a handle 54 is provided on the nut to facilitate its operation. Through the construction just described the arm bracket, mounting plate, and arm are tied together by the stud so that the arm bracket can be freely rotated about the axis of the stud, which is a vertical axis, when the nut 53 is loosened, and when the parts are in the desired rotative position they can be securely set against movement or shifting by merely tightening the nut 53 on the stud.

In accordance with the preferred form of my invention I provide stop means at the pivotal connection I have just described. The particular stop means illustrated involves a fixed stop or lug 55 on one of the parts, say, for instance, on the upper end portion of the arm bracket, and spaced stop screws 56 carried by lugs 57 on another part, say for instance, the plate 44. The stop screws are so spaced and are adjusted to stop the lug 55 in two predetermined positions. The stop means is shown with the lug 55 stopped in one position in Fig. 2 of the drawings.

The saw bracket 33 is carried by the arm bracket 31 and in turn supports the saw S. In its preferred form the forward end of the saw bracket is provided with a flat vertical face 60 which seats against the flat face 40 at the inner side of the lower end part 38 of the arm bracket 31. The means 34 pivotally connects the forward end portion of the saw bracket with the lower end portion of the arm bracket so the saw bracket is rotatable relative to the arm bracket about a horizontal axis. In the preferred construction illustrated the pivotal connection involves a clamp screw 62 passed through an opening in the lower end portion 38 of the arm bracket to thread into a tapped bore 63 in the forward end portion of the saw bracket. A head 64 is provided to clamp against the outer side 39 of the end part 38 and is provided with projections 65 in the form of handles to facilitate rotation of the screw. When the screw is loosened the saw bracket can be freely rotated about the axis of the screw but when the screw is tightened the saw bracket is held in a fixed position relative to the arm bracket.

The body portion 61 of the saw bracket is an elongate part arcuate in form and extends in the general direction of the axis of the pivotal connection 34 and laterally thereof to embrace a part of the saw. In the case illustrated the body portion 61 embraces or fits around the guard 19 of the saw and it is so shaped and proportioned that when the guard is seated in it the axis of the saw shaft 13 intersects the axis of the pivotal connection 34.

Through the pivotal connection 34 the saw bracket can be turned to various positions in order to tilt the saw blade to various angles. In practice I may provide a means to indicate the angular position of the saw blade, for instance, I may provide a suitable scale on the end 38 of the arm bracket and a pointer or indicator 70 on the saw bracket to cooperate with the scale.

The means 35 provided to mount the saw S in the saw bracket will, in practice, vary, depending upon the particular saw being mounted. In the case illustrated I show means for holding the saw at two spaced points and the saw is such that one of these means may include a pair of spaced lugs 71 on the forward end part of the saw bracket facing the saw to receive the apertured projection 15 on the forward end of the saw and a retaining screw 72 may be passed through the lugs 71 and projection 15 to retain the parts in the engaged position as shown in Fig. 5. At a point remote from the connection just described I may connect the body of the saw bracket to a part of the saw, as for instance to the guard of the saw. In the case illustrated (Fig. 6) I show a threaded projection 80 projecting from the saw to extend through an opening 81 in the body of the saw bracket and a retaining nut preferably a wing nut 82 is threaded onto the projection.

In carrying out my invention I may provide various other features or refinements, for instance, I may make the body portion 61 of the saw bracket curved or shell-like in cross section to conform to the guard of the saw, and I may provide adjustable stop means for stopping the saw bracket in a predetermined rotative position relative to the arm bracket. In the case illustrated (Fig. 3) I show a stop lug 85 on the arm bracket and a stop screw 86 carried by a lug 87 on the saw bracket, the screw being located to engage the lug 85 to positively stop rotation between the two brackets at the desired point.

Further, in the preferred form of the invention I may provide a work engaging stop or rest, as circumstances require. In the case illustrated I show a stem 90 slidably carried by the forward end portion of the saw bracket, which stem is adapted to be set in any desired position by a set screw 91. The stem has a guide or pressure foot 92 suitably formed as shown in the drawings.

It is believed that the operation of my mounting construction will be fully understood from the foregoing description. In some instances the arm 26 will be carried so that it is free to reciprocate, in which case the saw blade will be disposed in a plane parallel to the direction of movement of the arm 26. This positioning of the saw blade can be readily brought about by suitably turning the arm bracket about the pivotal connection 32.

When the saw is located in this general position it can be tilted out of the vertical plane to any desired angle by swinging it about the pivotal connection 34.

If it is desired to locate the blade in a plane at right angles to the arm 26 this can be done by positioning the parts in the manner shown in Fig. 1 of the drawings and while in this transverse position the saw can be pitched or tilted to any desired position by moving it about the pivotal connection 34. It will be readily understood that there are numerous other positions that can be gained by suitably operating the parts about the pivotal connections. With the construction that I have provided it is a very simple quick operation to apply the saw S to the saw bracket and when the saw is desired for use free of the bracket it is a simple matter to disconnect it.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A mounting for applying a motor driven saw having a motor with a saw blade at one end and a handle at the other end and in which the blade is in a plane extending in the direction of the axis of the motor to one end of a reciprocating horizontal support arm including, an arm bracket, means attaching the upper end of the arm bracket to the support arm so the arm bracket extends down from the point where the bracket connects to the arm to a point where its lower end is horizontally offset from the point of connection between the support arm and arm bracket, an elongate saw bracket, a pivotal connection joining one end of the saw bracket to the lower end of the arm bracket so the saw bracket extends horizontally under the arm bracket and beneath the upper end of the arm bracket, the axis of said connection being horizontal and extending in the direction of the saw bracket, and means attaching the saw to the saw bracket with the handle of the saw beyond the other end of the saw bracket and with the saw adjacent said connection and in a plane extending in the direction of the saw bracket.

2. A mounting for applying a motor driven saw having a motor with a saw blade at one end and a handle at the other end and in which the blade is in a plane extending in the direction of the axis of the motor to one end of a reciprocating horizontal support arm including, an arm bracket, means attaching the upper end of the arm bracket to said end of the arm so the arm bracket extends down to a point where its lower end is horizontally offset from the point where the arm bracket connects to the arm, an elongate saw bracket, a pivot member connecting one end of the saw bracket to the said offset lower end of the arm bracket, the saw bracket having a guard portion that extends horizontally and up from the point where it connects to the arm bracket, the axis of said pivot member being horizontal and extending beneath the said means and extending in the general direction of the saw bracket to be beneath the guard portion thereof, and means attaching the saw to the saw bracket with the blade beneath the guard portion of the saw bracket and the handle beyond the other end of the saw bracket.

3. A mounting for applying a motor driven saw with a motor and a rotating disc blade at one end of the motor in a plane parallel with the axis of the motor and a handle at the other end of the motor to a reciprocating horizontal support arm including, an arm bracket, means attaching the upper end of the arm bracket to the arm so the arm bracket extends down from the end of the arm to a point where its lower end is horizontally offset from the point where the bracket connects to the arm, an elongate saw bracket, a horizontal pivot member connecting the forward end of the saw bracket to the lower end of the arm bracket, the saw bracket having an elongate guard portion that is curved in cross section and which is longitudinally curved to extend horizontally and upward under the arm bracket and beneath said means, and means releasably connecting the saw and the guard portion of the saw bracket with the blade beneath the guard portion of the saw bracket and in a plane parallel therewith and with the handle beyond the other end of the saw bracket.

4. A mounting for applying a motor driven saw in which the saw is in a plane parallel with the axis of the motor to a horizontal reciprocating support arm including, an arm bracket, means attaching the upper end of the arm bracket to the arm so the arm bracket extends down and has its lower end laterally offset from the point where the bracket connects to the arm, said means including a plate applicable to the arm and receiving the upper end of the bracket and a member extending between the bracket and arm and operable to clamp the bracket and plate and arm against relative movement, adjustable stop means limiting pivotal movement of the bracket relative to the arm, an elongate upwardly curved saw bracket, a horizontal pivot member connecting the forward end of the saw bracket to the lower end of the arm bracket so the saw bracket extends under the arm bracket on an axis extending under said point, and means attaching the saw to the saw bracket with the saw adjacent said member and beneath the saw bracket, the stop means including spaced stop screws carried by the plate and a stop lug on the arm bracket and between the screws.

5. A mounting for applying a motor driven saw with a motor and a disc blade in a plane parallel with the axis of the motor to a horizontal reciprocating support arm including, an arm bracket, means attaching the upper end of the arm bracket to one end of the arm so the arm bracket extends down and its lower end is laterally removed from the point where the bracket connects to the arm, an elongate arcuate saw bracket curved in cross section, means pivotally connecting the forward end of the saw bracket to the lower end of the arm bracket so the saw bracket extends horizontally and upward under the arm and beneath said end of the arm, and screw means releasably attaching the saw to the saw bracket with the blade of the saw beneath the saw bracket and in a plane parallel with the saw bracket.

6. A mounting for applying a saw having a motor, a disc blade at one end of the motor, a guard over the blade and a handle at the other end of the motor to a horizontal reciprocating support arm including, an arm bracket, means attaching the upper end of the arm bracket to the arm so the arm bracket extends down from the point where the bracket connects to the arm and has its lower end horizontally offset from said point, an elongate arcuate saw bracket, a horizontal pivot member connecting the forward end of the saw bracket to the lower end of the arm bracket so the saw bracket extends up and under the arm bracket and beneath said point, and means connecting the saw to the saw bracket including releasable fastening means attaching the first mentioned end of the motor to the forward end of the saw bracket and releasable means attaching the guard of the saw to the other end of the saw bracket with the guard and blade of the saw beneath the saw bracket.

7. A mounting for applying a saw having a motor, a disc blade at one end of the motor in a plane parallel with the axis of the motor and a handle at the other end of the motor to a horizontal reciprocating support arm including, an arm bracket, means attaching the upper end of the arm bracket to one end of the arm so the arm bracket extends down and has its lower end laterally offset from the point where the bracket connects to the arm, an elongate arcuate saw bracket curved in cross sectional configuration with its concave side faced downward, a horizontal pivot member connecting the forward end of the saw bracket to the lower end of the arm bracket on an axis extending beneath the said point and so the saw bracket normally extends horizontally and upward from the lower end of the arm bracket, and means attaching the saw to the saw bracket with the upper part of the saw embraced in the concave portion of the saw bracket and the blade of the saw in close proximity to said member and beneath the saw bracket, the arm bracket being curved in cross sectional configuration between its ends.

ARTHUR C. JOHNSON.

REFERENCES CITED

The following references are of record in the file of this patent:

UNITED STATES PATENTS

| Number | Name | Date |
|---|---|---|
| 1,601,610 | Carter | Sept. 28, 1926 |
| 1,636,924 | Porter | July 26, 1927 |
| 1,646,589 | Meek et al. | Oct. 25, 1927 |
| 1,846,295 | Wilderson | Feb. 23, 1932 |
| 1,846,641 | Hedgpeth | Feb. 23, 1932 |
| 1,865,759 | Hughes | July 5, 1932 |
| 1,867,275 | McCarter | July 12, 1932 |
| 1,894,010 | Tautz | Jan. 10, 1933 |
| 2,242,336 | Atwood | May 20, 1941 |
| 2,317,568 | Wallace et al. | Apr. 27, 1943 |